United States Patent [19]
Giorgio et al.

[11] Patent Number: 4,611,098
[45] Date of Patent: Sep. 9, 1986

[54] CODED TELEPHONE ACCESS SYSTEM

[76] Inventors: Paul J. Giorgio, 285 River Ave., Providence, R.I. 02908; Paul M. Duhaime, 18 Jade Rd., Coventry, R.I. 02816

[21] Appl. No.: 677,945

[22] Filed: Dec. 4, 1984

[51] Int. Cl.⁴ .................. H04M 1/21; H04M 11/02
[52] U.S. Cl. ........................ 179/84 C; 179/84 VF
[58] Field of Search .......... 179/84 C, 84 VF, 84 SS, 179/84 R, 81 R, 2 DP, 2 A

[56] References Cited
U.S. PATENT DOCUMENTS

| | | | |
|---|---|---|---|
| 3,984,637 | 10/1976 | Caudill et al. | 179/2 DP |
| 4,383,138 | 5/1983 | Castro et al. | 179/84 C |
| 4,430,728 | 2/1984 | Beitel et al. | 179/2 DP X |
| 4,446,334 | 5/1984 | Groff | 179/84 C X |

Primary Examiner—James L. Dwyer
Attorney, Agent, or Firm—Robert F. Beers; Arthur A. McGill; Prithvi C. Lall

[57] ABSTRACT

A telephone access system provides to the caller connection to an output upon receipt of a coded signal from the caller. Units are connected in sequence for receipt of each member of the coded signal. The caller has a predetermined period of time to enter the correct code or the system automatically hangs up. The system described uses TOUCH-TONE and all components are state of the art.

5 Claims, 3 Drawing Figures

CODED TELEPHONE ACCESS SYSTEM

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The present invention generally relates to a telephone system. More particularly, it pertains to a system for screening incoming telephone calls via a Dual Tone Multi-frequency (DTMF) access code with a capability of providing access to those with the right combination and hanging up on those unable to provide the combination within a fixed period of time. The system permits the connection of peripherals to a computer, screens incoming calls or monitors sounds that transpire in a room.

(2) Description of the Prior Art

At the present time, there does not appear to be any device that permits a telephone caller to remotely monitor sounds in a room via a DTMF access code. Also there is no device available that permits a caller to connect peripherals to a computer over a telephone line via a DTMF access code. Present day telephone-to-computer hook-up involves use of a telephone, modem and CRT/keyboard. Under this present system, a caller can connect into a computer after dialing a number and entering a password or user ID number. If the caller does not have a password, he is denied access to the computer. A disadvantage to this system is that any caller can tie up a telephone line and waste expensive Central Processing Unit (CPU) time trying to gain access to the computer.

Finally, present day screening of incoming calls is accomplished by the use of a non-published, non-listed telephone number. This number is given by the owner to a select group of individuals. If the number is obtained by an unauthorized person, a request to the telephone company to change the telephone number must be submitted. This procedure is both costly and time consuming.

SUMMARY OF THE INVENTION

The present invention is adapted to connect to a telephone line and permit a caller by entering a DTMF access code via TOUCH-TONE, to connect peripherals to a computer, screen incoming calls or monitor sounds that transpire in a room. The system can be reset at source or through the telephone line using TOUCH-TONE. The system includes an access code with as many digits as needed and this access code can be changed anytime using thumbwheel switches. If the system is activated by an unauthorized caller who does not have knowledge of the access code, the system hangs up, i.e., disconnects the telephone line from the caller.

DESCRIPTION OF THE PREFERRED EMBODIMENT

Figure 1:
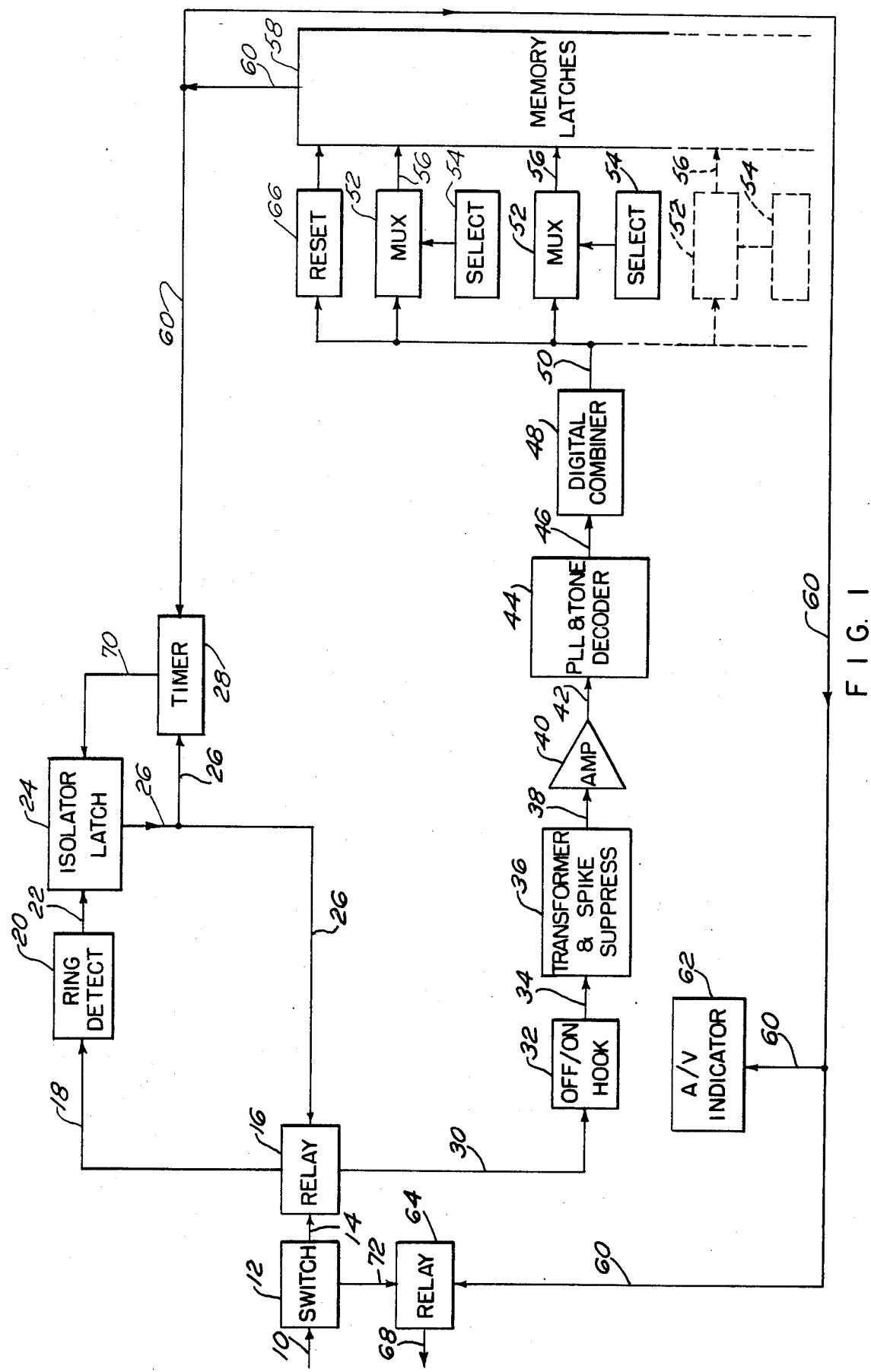
FIG. 1 is a block diagram in accordance with the present invention.

Refer now to the block diagram of FIG. 1 for a general description of the operation of the device and the components required to carry out this operation. A more detailed description is given later on with reference to the remaining figures. In all figures, identical components within the circuit carry identical numbers. However, if a block in FIG. 1 is represented in the other figures by various components, then different markings are used to denote each component not shown in FIG. 1.

A telephone signal received on line 10 is passed through switch 12. The output signal of switch 12 appearing on line 14 is passed through the closed contacts of relay 16. The signal appears on line 18 and is passed to ring detect 20. When a ring signal enters line 10, the output of ring detect 20 appears on line 22 and energizes a photo-transistor (shown in FIG. 2A) that is part of the optical isolator and digital latching circuit 24. The output from unit 24 appears on line 26, thereby providing the dual functions of energizing relay 16 and starting timer 28. On energizing relay 16, the input telephone signal on line 14 is now passed through the other contacts of relay 16 to line 30. Line 30 connects to an OFF/ON hook detector 32 that parallels the input telephone signal with a low impedance. This simulates an OFF hook condition. The caller senses this OFF hook condition and sequentially enters the DTMF signals. The DTMF signals comprising dual sinusoidal waveforms are applied to transformer and spike suppressor 36 from OFF/ON hook detector 32 through line 34. The output from transformer and spike suppressor 36 is amplified and DC isolated from the input signal on line 10. The signal is then further amplified by amplifier 40 after passing through line 38. The amplified sinewaves on line 42 pass to phase lock loop and tone decoder 44. Unit 44 comprises phase lock loops that output a digital code which represents various input sinewave frequencies or TOUCH-TONE digits. The output from phase lock loop and tone decoder 44 is transmitted over line 46 to digital combiner 48 that passes a combined digital output over lines 50 to a plurality of digital multiplexers 52. Select switches 54 are used to set the desired access code. Once selected, only the digital code representing the correct DTMF access code is allowed to pass from multiplexers 52 to memory latches 58 through lines 56. The signals from lines 56 set sequence memory latches which output an acknowledgement signal over line 60 to timer 28, relay 64 and audio/visual indicator 62. This acknowledgement signal stops timer 28 and connects the input telephone signal on line 10 through switch 12, line 72 and contacts of relay 64 to output line 68.

Line 68 can connect to a computer, telephone, conference telephone or any other device that connects to a telephone line. Audio/Visual Indicator 62, once set, can signal that a caller has correctly entered the DTMF access code. A digital reset 66 can be activated from a TOUCH-TONE signal on line 10 through digital combiner 48 or manually from a switch (shown in FIG. 2B) to reset the system and disconnect the input telephone signal on line 10 from the output signal line 68. Alternatively, switch 12 can be used to bypass the system and directly connect input signal line 10 to output line 68.

Initially, if the system senses a ring signal at ring detect 20 and the caller fails to enter the correct DTMF access code within a given time limit set by timer 28, the output from timer 28 on line 70 resets unit 24 that in turn resets relay 16. The system now disconnects the telephone line from the caller and hangs up.

Figure 2A:
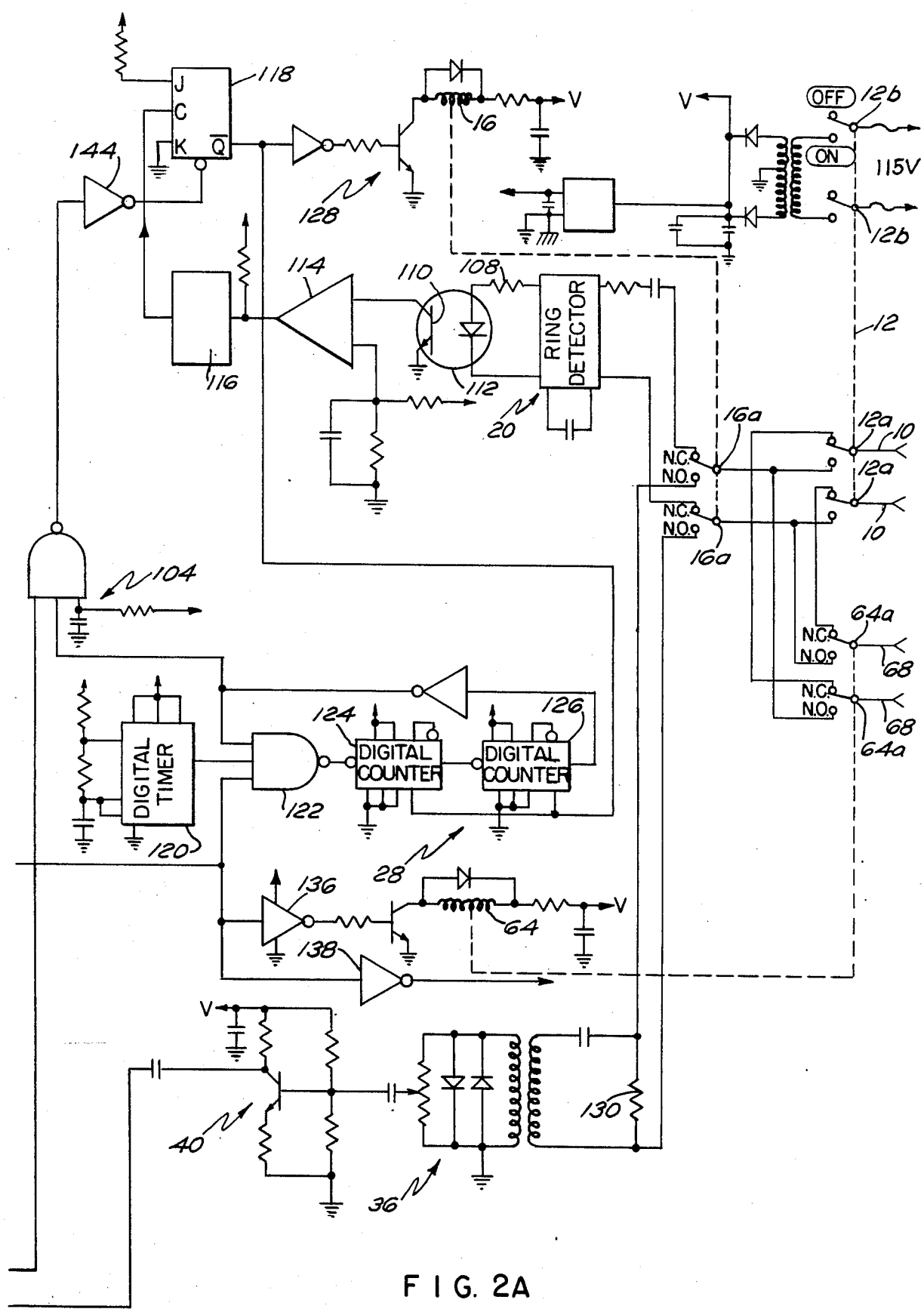
FIGS. 2A and 2B when joined together, comprise a schematic representation showing components within the diagram of FIG. 1.
Figure 2B:
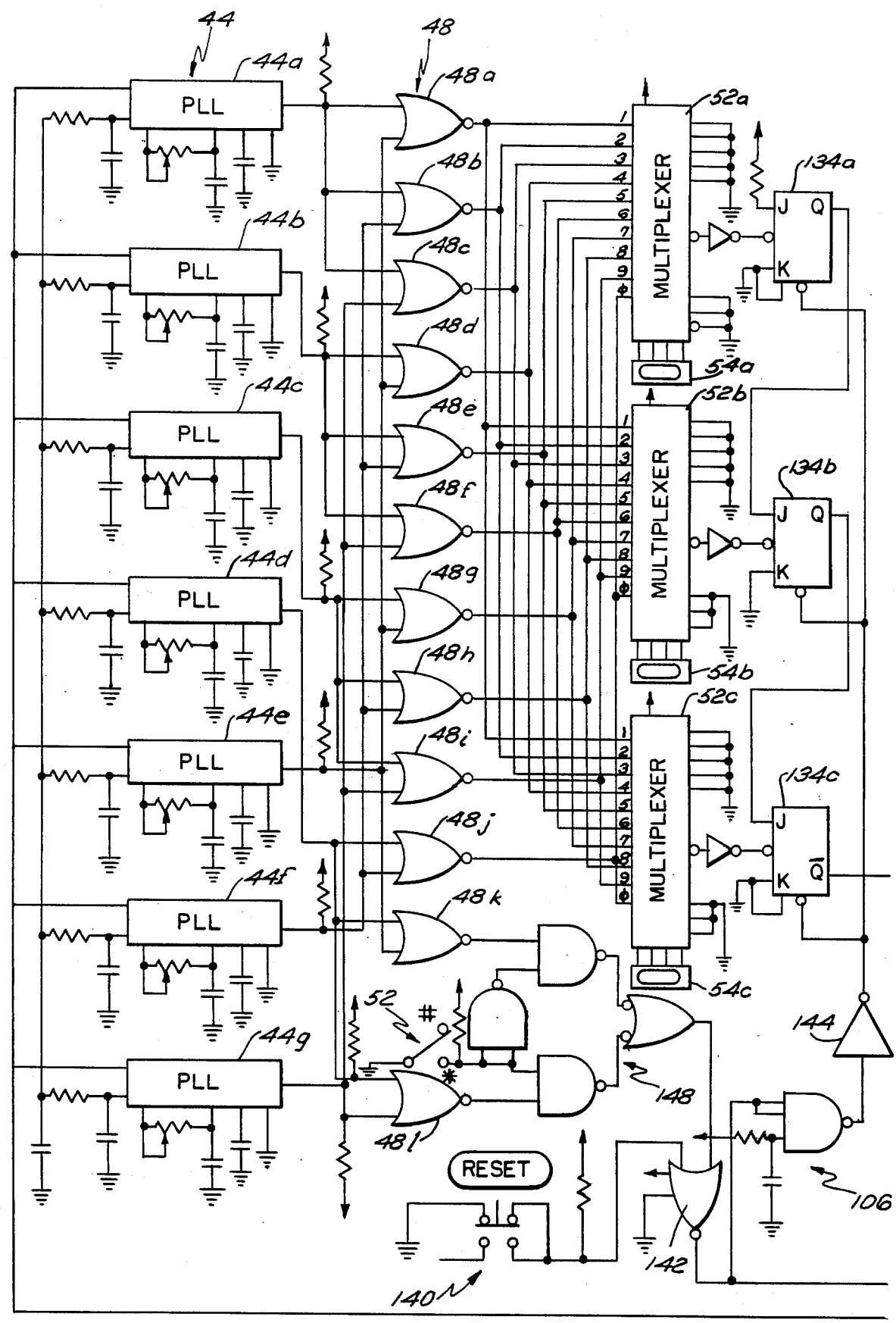

Refer now to FIGS. 2A and 2B for a more detailed explanation of the present invention. All components described are standard shelf items widely available to the public.

The system is connected to a telephone line for receiving an input signal over line 10 at contacts 12a of switch 12. The output (not shown) which can include a computer, telephone or conference telephone is connected to line 68 through contacts 64a of relay 64. Contacts 12b of switch 12 are connected to a 115 volt, 60 Hz outlet. Initially, switch 12 has its contacts in the OFF position.

Switch 12 is now set to the ON position. Timing circuits 104 and 106 reset all internal circuitry. A caller dials the telephone number where the device is connected. A rotary dial or TOUCH-TONE can be used. The ring signal of approximately 20 Hz enters the system through contacts 12a, passes through relay contacts 16a, and is sensed by ring detector 20. The ring detector 20 sources current through resistor 108 and saturates the output photo-transistor 110 of optoisolator 112. The saturated output state of the photo-transistor 110 is sensed by comparator 114 which in turn triggers one shot 116. The output from the one shot 116 sets JK flip-flop 118 forcing the $\overline{Q}$ output to a logic LOW.

JK flip-flop 118 $\overline{Q}$ output now at a logic LOW provides an enabling signal for the internal twenty second timer 28 made up of digital timer 120, NAND gate 122, digital counter 124, and digital counter 126. JK flip-flop 118 $\overline{Q}$ output at a logic LOW also energizes relay 16 through drive transistor circuitry 128. Relay 16 contacts 16a are now switched to the normally open position. This condition places the input telephone line in parallel with resistor 130. Resistor 130 simulates an OFF-hook condition to the input telephone line and drops the input DC line voltage from approximately 48 VDC to approximately 8 VDC.

In the present system the caller can now enter a three digit access code. Obviously, an access code with more digits would be provided if additional MUXs and switches are added. Entering this three digit access code produces three sets of two-tone (dual-tone) frequencies that are coupled and stepped-up through transformer and spike suppressor circuit 36 to the amplifier 40. The signals, now amplified, are passed to the seven phase lock loops 44a–g which together make up the phase lock loop tone decoder 44 of FIG. 1. The internal voltage controlled oscillators of the seven phase-lock loops are set to the standard TOUCH-TONE frequencies by means of trimmer potentiometers.

Pairs of outputs from phase lock loops 44a–g are selected as inputs for digital combiner 48 comprised of NOR circuits 48a–l. Each of the outputs of NOR circuits 48a–j provide inputs for digital multiplexers 52a, 52b and 52c. Select switches 54a, 54b and 54c are used to determine the access code for respective multiplexers 52a–c.

In operation, when a caller enters a "5", for example, the signal is made up of two frequencies, 770 Hz and 1336 Hz. These two frequencies have phase lock loops 44b and 44f each provide a logic low signal to NOR circuit 48e. The output of NOR circuit 48e becomes a logic HIGH. If thumbwheel switch 54a is set to a "5", then digital multiplexer 52a on receiving a signal provides an output to JK flip-flop 134a. This sets the Q output to a logic HIGH on the JK flip flop 134a. If thumbwheel number one 54a is set to a digit other than a "5", the multiplexer 52a will not accept the input from NOR circuit 48e and the device will, within twenty seconds, time out and disconnect the caller from the telephone line (hang-up).

The setting of the $\overline{Q}$ output to a logic HIGH on JK flip-flop 134a sends an enabling signal to JK flip-flop 134b. When the second digit of the access code is entered, one can see by the above sequence that an enabling signal will be sent from JK flip-flop 134b to JK flip-flop 134c. On receipt of the third digit of the access code, JK flip-flop 134c has its $\overline{Q}$ output go to a logic LOW. The signal from the $\overline{Q}$ output disables the internal timing circuit 28. Inverter 136 also receives the logic LOW from the JK flip-flop 134c $\overline{Q}$ output. Inverter 136 then produces a logic HIGH output picking up relay 64.

This transfers relay contacts 64a to the NO position. This connects the input telephone line 10 to the output line 68. Line 68 can connect to an output comprised of a telephone, computer or conference telephone. Additionally, inverter 138 provides a logic HIGH output that can be used to trigger a visual or audio indicator verifying that proper connection to the telephone line has been made.

A momentary reset switch 140 can now be used to reset all internal circuitry and to disconnect the input telephone line 10 from output line 68. When switch 140 is actuated, the NOR Gate 142 output goes low. This puts the output of NAND gate 104 high. This is inverted to low by inverter 144 which resets flip-flop 118. Once reset, flip-flop 118 $\overline{Q}$ output is high. This causes drive transistor circuitry 128 to deactivate relay 16 which returns contacts 16a to the normally closed position. In addition, the $\overline{Q}$ output of flip-flop 118 resets counters 124 and 126. The output from NOR Gate 142 also passes through reset circuitry 106 and is inverted by inverter 144. This resets flip-flops 134a–c. The $\overline{Q}$ output of 134c now at a HIGH state enables NAND Gate 122 to pass a clock signal from timer 120. However, counters 124 and 126 are disabled in this condition due to the signal from flip-flop 118 $\overline{Q}$ output. To enable the counters 124 and 126 a ring signal must be detected by ring detector 20.

Flip-flop 134c $\overline{Q}$ output now HIGH also deenergizes relay 64 returning contacts 64a to the normally closed position thereby inhibiting any signal from reaching output lines 68. Inverter 138 output is now LOW, signaling the audio or visual indicator to turn off. Alternately, the caller can reset the device from the phone by entering a * or # via TOUCH-TONE. The choice of either * or # can be preselected from switch 52. Once the caller enters the correct reset code (* or #) this signal enters from line 10 passes through associated circuitry to phase lock loops 44a–g and then to NOR Gates 48k and 48l. The position of switch 52 determines which tone will be passed by gate selector circuit 148 to NOR Gate 142. The remainder of the circuit operates as described for reset switch 140.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A dual tone multiple frequency access system comprising:

input switching means for transmitting a telephone input signal;

operating means connected to said input switching means for receiving said telephone signal, said operating means having a plurality of output terminals with each output terminal connected to represent a different digit from 0 through 9, said operating means also for providing an output signal on selected members of said plurality of output terminals in a sequence that is determinative of the numerical representation of the received telephone input signal;

select switching means including a plurality of select switches in sequential order connected to said operating means output terminal for providing an output signal if signals are received from predetermined members in a predetermined sequence within a predetermined period of time;

relay means having a relay connected to said select switching means and said relay having open contacts connected to said input switching means and adapted to connect to various selected output components, said relay means for closing said open contacts to transmit said telephone input signal through said contacts upon actuation of said relay upon receipt of a signal from said select switching means;

said input switching means further comprises an input switch for transmitting a telephone input signal, sensing means connected to said input switch for providing an output signal upon detection of a ring signal, timing means connected to said sensing means for starting a predetermined timing interval upon receipt of said sensing meansoutput signal, for being stopped from further operation upon operation of said relay means and for inhibiting conduction of said telephone input signal upon expiration of said timing interval when not stopped by said relay means from further operation, ring detect switching means connected to said sensing means for inhibiting transmission of the telephone input signal from said input switch to said sensing means and redirecting said telephone input signal, and OFF/ON hook detecting means connected to said ring detect switching means for receiving the redirected telephone input signal; and said operating means further comprises phase lock loop and tone decoder means connected to said OFF/ON hook detecting means for receiving said redirected telephone input signal and for providing a plurality of output digital code signal indicative of said redirected telephone input signal, and digital combiner means connected to receive said plurality of output lines for providing an output signal on a predetermined output line wherein the predetermined output line selected is determinative of the numerical value of the digital code received.

2. A dual tone miltiple frequency access system comprising:

input switching means for transmitting a telephone input signal;

operating means connected to said input switching means for receiving said telephone signal, said operating means having a plurality of output terminals with each output terminal connected to represent a different digit from 0 through 9, said operating means also for providing an output signal on selected members of said plurality of output terminals in a sequence that is determinative of the numerical representation of the received telephone input signal;

select switching means including a plurality of select switches in sequential order connected to said operating means output terminals for providing an output signal if signals are received from predetermined members in a predetermined sequence within a predetermined period of time;

relay means having a relay connected to said select switching means and said relay having open contacts connected to said input switching means and adapted to connect to various selected output components, said relay means for closing said open contacts to transmit said telephone input signal through said contacts upon actuation of said relay upon receipt of a signal from said select switching means; and said operating means further comprises phase lock loop and tone decoder means connected to said input switching means for receiving said telephone input signal and for providing a plurality of output digital code signals indicative of said telephone input signal and, digital combiner means connected to receive said plurality of output lines for providing an output signal on a predetermined output line wherein the predetermined output line selected is determinative of the numerical value of the digital code received.

3. A dual tone multiple frequency access system according to claim 2 wherein said input switching means further comprises timing means for receiving said telephone input signal, for starting a predetermined timing interval upon receipt of said telephone input signal, for being stopped from further operation upon operation of said relay means and for inhibiting conduction of said input signal upon expiration of said timing interval when not stopped by said relay means from further operation.

4. A dual tone multiple frequency access system comprising:

input detecting means for receiving a telephone input signal, said signal input detecting means having a plurality of output terminals with each output terminal connected to represent a different digit from 0 through 9, said input detecting means also for providing an output signal on selected members of said plurality of output terminals in a sequence that is determinative of numerical representation of the received telephone input signal;

select switching means including a plurality of select switches in sequential order connected to said input detecting means output terminals for providing an output signal if signals are received from predetermined members of said input detecting means plurality of output terminals in a predetermined sequence within a predetermined period of time;

relay means having a relay connected to said select switching means and said realy having open contacts connected to said input switching means and adapted to connect to various selected output components, said realy means for closing said open contacts to transmit said telephone input signal through said contacts upon actuation of said relay upon receipt of a signal from said select switching means;

said input detecting means further comprises input switching means for transmitting a telephone input signal and operating means connected to said input switching means for receiving said telephone signal, said operating means having a plurality of output terminals, said operating means providing signals on preselected members of said plurality of output terminals that are determinative of the digital value of the received telephone input signal;

said input switching means further comprises an input switch for transmitting a telephone input signal, sensing means connected to said input switch for providing an output signal upon detection of a ring signal, timing means connected to said sensing means for starting timing upon receipt of said sensing means output signal, for being stopped from further operation upon operation of said relay means and for inhibiting conduction of said telephone input signal upon expiration of said timing interval when not stopped by said relay means from further operation, ring detect switching means connected to said sensing means for inhibiting transmission of the telephone input signal from said input switch to said sensing means and redirecting said telephone input signal, and OFF/ON hook detecting means connected to said ring detect switching means for receiving the redirected telephone input signal; and said operating means further comprises phase lock loop and tone decoder means connected to said OFF/ON hook detecting means for receiving said redirected telephone input signal and for providing a plurality of output digital code signals indicative of said redirected telephone input signal, and digital combiner means connected to receive said plurality of output lines for providing an output signal on a predetermined output line wherein the predetermined output line selected is determinative of the numerical value of the digital code received.

5. A dual tone multiple frequency access system comprising:

input detecting means for receiving a telephone input signal, said singal input detecting means having a plurality of output terminals with each output terminal connected to represent a different digit from 0 through 9, said input detecting means also providing an output signal on selected members of said plurality of output terminals in a sequence that is determinative of numerical representation of the received telephone input signal;

select switching means including a plurality of select switches in sequential order connected to said input detecting means output terminals for providing an output signal if signals are received from predetermined members of said input detecting means plurality of output terminals in a predetermined seqeunce within a predetermined period of time;

relay means having a relay connected to said select switching means and said relay having open contacts connected to said input switching means and adapted to connect to various selected output components, said relay means for closing said open contacts to transmit said telephone input signal through said contacts upon actuation of said relay upon receipt of a signal from said select switching means;

said input detecting means further comprises input switching means for transmitting a telephone input signal and operating means connected to said input switching means for receiving said telephone signal, said operating means having a plurality of output terminals, said operating means providing signals on preselected members of said plurality of output terminals that are determinative of the digital value of the received telephone input signal; and said operating means further comprises phase lock loop and tone decoder means connected to said OFF/ON hook detecting means for receiving said redirected telephone input signal and for providing a plurality of output digital code signals indicative of said redirected telephone input signals, and digital combiner means connected to receive said plurality of output lines for providing an output signal on a predetermined output line wherein the predetermined output line selected is determinative of the numerical value of the digital code recieved.

* * * * *